US008229858B1

(12) United States Patent
Mazza et al.

(10) Patent No.: US 8,229,858 B1
(45) Date of Patent: Jul. 24, 2012

(54) GENERATION OF ENTERPRISE-WIDE LICENSES IN A CUSTOMER ENVIRONMENT

(75) Inventors: Bruce P. Mazza, Thornton, CO (US); William T. Walker, Evergreen, CO (US)

(73) Assignee: Avaya Inc., Basking Ridge, NJ (US)

( * ) Notice: Subject to any disclaimer, the term of this patent is extended or adjusted under 35 U.S.C. 154(b) by 1514 days.

(21) Appl. No.: 11/051,316

(22) Filed: Feb. 4, 2005

Related U.S. Application Data

(60) Provisional application No. 60/615,432, filed on Sep. 30, 2004.

(51) Int. Cl.
G06F 21/00 (2006.01)

(52) U.S. Cl. .......... 705/59; 726/1; 726/21; 726/26; 726/27; 705/51; 705/901; 705/902; 705/904

(58) Field of Classification Search .............. 705/59
See application file for complete search history.

(56) References Cited

U.S. PATENT DOCUMENTS

| 4,288,659 A | 9/1981 | Atalla .......... 178/22.08 |
| 4,405,829 A | 9/1983 | Rivest et al. |
| 4,780,821 A | 10/1988 | Crossley |
| 4,811,393 A | 3/1989 | Hazard .......... 380/21 |
| 4,888,800 A | 12/1989 | Marshall et al. .......... 380/21 |
| 4,937,863 A | 6/1990 | Robert et al. .......... 710/200 |
| 5,005,122 A | 4/1991 | Griffin et al. |
| 5,023,907 A | 6/1991 | Johnson et al. |
| 5,157,663 A | 10/1992 | Major et al. .......... 714/10 |
| 5,179,591 A | 1/1993 | Hardy et al. .......... 380/21 |
| 5,204,897 A | 4/1993 | Wyman .......... 380/4 |
| 5,206,903 A | 4/1993 | Kohler et al. |
| 5,230,020 A | 7/1993 | Hardy et al. .......... 380/21 |
| 5,260,999 A | 11/1993 | Wyman |
| 5,307,481 A | 4/1994 | Shimazaki et al. .......... 714/11 |
| 5,329,570 A | 7/1994 | Glassmacher et al. .......... 379/189 |
| 5,341,427 A | 8/1994 | Hardy et al. .......... 380/21 |
| 5,347,580 A | 9/1994 | Molva et al. |
| 5,386,369 A | 1/1995 | Christiano |
| 5,390,297 A | 2/1995 | Barber et al. |

(Continued)

FOREIGN PATENT DOCUMENTS

EP    1 071 253 A1    1/2001

(Continued)

OTHER PUBLICATIONS

Microsoft Systems Management Server 2.0 Resource Guide, Microsoft Press, 1999. ISBN 0-7356-0583-1.*

(Continued)

*Primary Examiner* — James A Reagan
*Assistant Examiner* — Calvin Cheung
(74) *Attorney, Agent, or Firm* — Sheridan Ross P.C.

(57) ABSTRACT

An enterprise licensing system is provided that includes a licensing agent 172 operable to (a) provide a customer with a first set of enterprise licensable features and/or capacities and a second set of non-enterprise licensable features and/or capacities, with the enterprise licensable features and/or capacities, but not non-enterprise licensable features and/or capacities, being allocable freely by the customer among first and second computational components; (b) receive a first allocation of the members of the first set between the first and second computational components; and (c) generate first and second licenses reflecting the first allocation. The first license is for the first computational component and the second license is for the second computational component.

10 Claims, 6 Drawing Sheets

U.S. PATENT DOCUMENTS

| | | | |
|---|---|---|---|
| 5,408,649 A | 4/1995 | Beshears et al. | 714/10 |
| 5,448,639 A | 9/1995 | Arazi | |
| 5,553,143 A | 9/1996 | Ross et al. | |
| 5,563,946 A | 10/1996 | Cooper et al. | |
| 5,579,222 A | 11/1996 | Bains et al. | |
| 5,629,980 A | 5/1997 | Stefik et al. | |
| 5,646,992 A | 7/1997 | Subler et al. | |
| 5,671,412 A * | 9/1997 | Christiano | 707/104.1 |
| 5,673,315 A | 9/1997 | Wolf | |
| 5,699,431 A | 12/1997 | Van Oorschot et al. | |
| 5,708,709 A | 1/1998 | Rose | 705/59 |
| 5,717,604 A | 2/1998 | Wiggins | 709/229 |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | 380/25 |
| 5,745,879 A | 4/1998 | Wyman | 705/1 |
| 5,754,761 A | 5/1998 | Willsey | |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A * | 8/1998 | Coley et al. | 709/203 |
| 5,796,941 A | 8/1998 | Lita | |
| 5,828,747 A | 10/1998 | Fisher et al. | |
| 5,835,600 A | 11/1998 | Rivest | |
| 5,864,620 A | 1/1999 | Pettitt | |
| 5,905,793 A | 5/1999 | Flockhart et al. | |
| 5,905,860 A | 5/1999 | Olsen et al. | 395/187.01 |
| 5,935,243 A | 8/1999 | Hasebe et al. | |
| 5,940,504 A | 8/1999 | Griswold | 705/59 |
| 5,956,505 A | 9/1999 | Manduley | |
| 5,956,716 A | 9/1999 | Kenner et al. | |
| 5,960,085 A | 9/1999 | de la Huerga | |
| 5,978,565 A | 11/1999 | Ohran et al. | 714/13 |
| 5,982,873 A | 11/1999 | Flockhart et al. | |
| 5,995,625 A | 11/1999 | Sudia et al. | |
| 6,006,016 A | 12/1999 | Faigon et al. | |
| 6,009,401 A | 12/1999 | Horstmann | |
| 6,011,973 A | 1/2000 | Valentine et al. | 455/456.6 |
| 6,023,763 A * | 2/2000 | Grumstrup et al. | 726/28 |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A | 11/2000 | Kobayashi et al. | 714/15 |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,343,280 B2 | 1/2002 | Clark | |
| 6,360,320 B1 | 3/2002 | Ishiguro et al. | |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 | 10/2002 | Geiger et al. | |
| 6,502,079 B1 | 12/2002 | Ball et al. | 705/59 |
| 6,513,117 B2 | 1/2003 | Tarpenning et al. | |
| 6,513,121 B1 | 1/2003 | Serkowski | 713/201 |
| 6,539,481 B1 | 3/2003 | Takahashi et al. | |
| 6,557,105 B1 | 4/2003 | Tardo et al. | |
| 6,574,612 B1 | 6/2003 | Baratti et al. | 705/59 |
| 6,584,454 B1 | 6/2003 | Hummel et al. | 705/59 |
| 6,615,347 B1 | 9/2003 | de Silva et al. | |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 | 2/2004 | Ishiguro et al. | |
| 6,704,885 B1 | 3/2004 | Salas-Meza et al. | |
| 6,760,324 B1 * | 7/2004 | Scott et al. | 370/352 |
| 6,765,492 B2 | 7/2004 | Harris | 340/686.6 |
| 6,769,063 B1 | 7/2004 | Kanda et al. | |
| 6,772,133 B1 | 8/2004 | Kambayashi et al. | |
| 6,775,782 B1 | 8/2004 | Buros et al. | |
| 6,778,820 B2 | 8/2004 | Tendler | 455/414.2 |
| 6,785,726 B1 | 8/2004 | Freeman et al. | |
| 6,795,941 B2 | 9/2004 | Nickels | |
| 6,816,842 B1 | 11/2004 | Singh et al. | |
| 6,826,606 B2 | 11/2004 | Freeman et al. | 709/223 |
| 6,842,896 B1 | 1/2005 | Redding et al. | |
| 6,850,958 B2 | 2/2005 | Wakabayashi | 707/204 |
| 6,854,010 B1 | 2/2005 | Christian et al. | 709/223 |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,941,283 B2 | 9/2005 | Kambayashi et al. | |
| 6,957,344 B1 | 10/2005 | Goldshlag et al. | |
| 6,959,291 B1 | 10/2005 | Armstrong et al. | |
| 6,961,858 B2 | 11/2005 | Fransdonk | |
| 6,968,384 B1 * | 11/2005 | Redding et al. | 709/229 |
| 6,973,444 B1 | 12/2005 | Blinn et al. | |
| 6,976,164 B1 | 12/2005 | King et al. | |
| 6,981,222 B2 | 12/2005 | Rush et al. | |
| 7,032,113 B2 | 4/2006 | Pendlebury | |
| 7,035,918 B1 * | 4/2006 | Redding et al. | 709/223 |
| 7,065,214 B2 | 6/2006 | Ishiguro et al. | |
| 7,069,468 B1 | 6/2006 | Olson et al. | |
| 7,073,063 B2 | 7/2006 | Peinado | |
| 7,085,382 B2 | 8/2006 | Terao et al. | |
| 7,096,469 B1 | 8/2006 | Kubala et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,206,936 B2 | 4/2007 | Aull et al. | |
| 7,225,333 B2 | 5/2007 | Peinado et al. | |
| 7,228,426 B2 | 6/2007 | Sinha et al. | |
| 7,260,557 B2 * | 8/2007 | Chavez | 705/59 |
| 7,302,703 B2 | 11/2007 | Burns | |
| 7,308,717 B2 | 12/2007 | Koved et al. | |
| 7,313,828 B2 | 12/2007 | Holopainen | |
| 7,318,236 B2 | 1/2008 | DeMello et al. | |
| 7,336,791 B2 | 2/2008 | Ishiguro | |
| 7,356,692 B2 | 4/2008 | Bialick et al. | |
| 7,382,881 B2 | 6/2008 | Uusitalo et al. | |
| 7,383,205 B1 | 6/2008 | Peinado et al. | |
| 7,415,729 B2 | 8/2008 | Ukeda et al. | |
| 7,545,931 B2 | 6/2009 | Dillaway | |
| 7,552,166 B2 * | 6/2009 | Chack | 709/202 |
| 7,565,325 B2 * | 7/2009 | Lenard et al. | 705/59 |
| 7,702,903 B1 * | 4/2010 | Roy et al. | 713/158 |
| 7,716,348 B1 * | 5/2010 | Redding et al. | 709/229 |
| 7,725,721 B2 * | 5/2010 | Yellai et al. | 713/171 |
| 2001/0001268 A1 | 5/2001 | Menon et al. | |
| 2001/0011254 A1 * | 8/2001 | Clark | 705/59 |
| 2001/0013024 A1 | 8/2001 | Takahashi et al. | |
| 2001/0034846 A1 | 10/2001 | Beery | |
| 2002/0001302 A1 | 1/2002 | Pickett | 370/352 |
| 2002/0010681 A1 * | 1/2002 | Hillegass et al. | 705/59 |
| 2002/0013722 A1 | 1/2002 | Kanaga | |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Imazu | |
| 2002/0104006 A1 | 8/2002 | Boate et al. | |
| 2002/0107809 A1 | 8/2002 | Biddle et al. | |

| | | |
|---|---|---|
| 2002/0112186 A1 | 8/2002 | Ford et al. |
| 2002/0116340 A1 | 8/2002 | Hellberg et al. |
| 2002/0125886 A1 | 9/2002 | Bates et al. .................. 324/307 |
| 2002/0138441 A1 | 9/2002 | Lopatic |
| 2002/0154777 A1 | 10/2002 | Candelore ..................... 380/258 |
| 2002/0164025 A1 | 11/2002 | Raiz et al. ..................... 380/231 |
| 2002/0169625 A1 | 11/2002 | Yang et al. |
| 2002/0169725 A1 | 11/2002 | Eng |
| 2002/0174356 A1 | 11/2002 | Padole et al. ................. 713/200 |
| 2002/0176404 A1 | 11/2002 | Girard ........................... 370/352 |
| 2002/0188656 A1 | 12/2002 | Patton et al. |
| 2002/0188704 A1 | 12/2002 | Gold |
| 2003/0005427 A1 | 1/2003 | Herrero ......................... 717/178 |
| 2003/0013411 A1 | 1/2003 | Uchiyama |
| 2003/0018491 A1* | 1/2003 | Nakahara et al. ................ 705/1 |
| 2003/0018582 A1 | 1/2003 | Yaacovi |
| 2003/0023564 A1 | 1/2003 | Padhye et al. |
| 2003/0055749 A1 | 3/2003 | Carmody et al. |
| 2003/0084306 A1 | 5/2003 | Abburi et al. |
| 2003/0095542 A1* | 5/2003 | Chang et al. ................. 370/352 |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0159033 A1 | 8/2003 | Ishiguro |
| 2003/0159070 A1 | 8/2003 | Mayer et al. |
| 2003/0163428 A1 | 8/2003 | Schneck et al. |
| 2003/0172035 A1 | 9/2003 | Cronce et al. |
| 2003/0177393 A1 | 9/2003 | Ishiguro |
| 2003/0191936 A1 | 10/2003 | Kawatsura et al. |
| 2003/0208449 A1 | 11/2003 | Diao |
| 2003/0220880 A1* | 11/2003 | Lao et al. ........................ 705/51 |
| 2003/0233547 A1 | 12/2003 | Gaston et al. |
| 2004/0003269 A1 | 1/2004 | Waxman et al. |
| 2004/0010440 A1 | 1/2004 | Lenard et al. |
| 2004/0010469 A1 | 1/2004 | Lenard et al. |
| 2004/0010471 A1* | 1/2004 | Lenard et al. ................... 705/59 |
| 2004/0039916 A1* | 2/2004 | Aldis et al. .................... 713/177 |
| 2004/0044629 A1 | 3/2004 | Rhodes et al. ................. 705/59 |
| 2004/0044630 A1 | 3/2004 | Walker et al. ................. 705/59 |
| 2004/0044631 A1 | 3/2004 | Walker et al. ................ 713/200 |
| 2004/0044901 A1 | 3/2004 | Serkowski et al. .......... 713/200 |
| 2004/0047354 A1 | 3/2004 | Slater et al. |
| 2004/0054909 A1 | 3/2004 | Serkowski et al. .......... 703/200 |
| 2004/0054930 A1 | 3/2004 | Walker et al. ................. 705/59 |
| 2004/0073517 A1 | 4/2004 | Zunke et al. ................... 705/59 |
| 2004/0078339 A1 | 4/2004 | Goringe et al. ................ 705/59 |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. ................ 713/201 |
| 2004/0133794 A1 | 7/2004 | Kocher et al. |
| 2004/0162998 A1 | 8/2004 | Tuomi et al. |
| 2004/0166878 A1 | 8/2004 | Erskine et al. ............. 455/456.1 |
| 2004/0167926 A1* | 8/2004 | Waxman et al. ........... 707/104.1 |
| 2004/0172367 A1 | 9/2004 | Chavez .......................... 705/59 |
| 2004/0181695 A1 | 9/2004 | Walker .......................... 713/202 |
| 2004/0181696 A1 | 9/2004 | Walker .......................... 713/202 |
| 2004/0199760 A1 | 10/2004 | Mazza .......................... 713/150 |
| 2004/0249763 A1* | 12/2004 | Vardi ............................. 705/59 |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1 | 4/2005 | Eng |
| 2005/0091507 A1 | 4/2005 | Lee et al. |
| 2005/0144437 A1 | 6/2005 | Ransom et al. |
| 2005/0154877 A1 | 7/2005 | Trench |
| 2005/0185792 A1 | 8/2005 | Tokutani et al. |
| 2005/0198510 A1 | 9/2005 | Robert et al. |
| 2005/0202830 A1 | 9/2005 | Sudit .......................... 455/456.1 |
| 2005/0229004 A1 | 10/2005 | Callaghan |
| 2005/0246098 A1 | 11/2005 | Bergstrom et al. ........... 701/213 |
| 2005/0289072 A1 | 12/2005 | Sabharwal |
| 2006/0021068 A1 | 1/2006 | Xu et al. |
| 2006/0026105 A1 | 2/2006 | Endoh |
| 2006/0036554 A1 | 2/2006 | Schrock et al. |
| 2006/0036894 A1 | 2/2006 | Bauer et al. |
| 2006/0064582 A1 | 3/2006 | Teal et al. |
| 2006/0089912 A1 | 4/2006 | Spagna et al. |
| 2006/0178953 A1 | 8/2006 | Aggarwal et al. |
| 2006/0190409 A1* | 8/2006 | Hillegass et al. ............... 705/59 |
| 2006/0242083 A1* | 10/2006 | Chavez .......................... 705/59 |
| 2006/0294010 A1 | 12/2006 | Kim et al. |
| 2007/0033419 A1 | 2/2007 | Kocher et al. |
| 2007/0094710 A1 | 4/2007 | Walker et al. |
| 2007/0107067 A1* | 5/2007 | Fountian ........................ 726/33 |
| 2007/0219917 A1 | 9/2007 | Liu et al. |
| 2008/0052295 A1 | 2/2008 | Walker et al. |
| 2008/0082449 A1 | 4/2008 | Wilkinson et al. |
| 2008/0141242 A1 | 6/2008 | Shapiro |
| 2008/0189131 A1* | 8/2008 | Chavez ........................... 705/1 |
| 2009/0119779 A1* | 5/2009 | Dean et al. ..................... 726/26 |
| 2009/0138975 A1* | 5/2009 | Richardson ..................... 726/32 |
| 2010/0049725 A1* | 2/2010 | Walker et al. ................. 707/100 |

FOREIGN PATENT DOCUMENTS

| | | |
|---|---|---|
| EP | 1562378 | 8/2005 |
| JP | 2006/085481 | 3/2006 |

OTHER PUBLICATIONS

MATLAB Installation Guide for PC, Release 11, The MathWorks Inc, 1999.*

Windows NT Server 4. Garms, Jason. SAMS Publishing, 1998. ISBN 0-672-31249-2.*

FLEXlm End Users Guide, Version 9.2. Jul. 2003. Published by Macrovision.*

How Computers Work, Millennium Edition. White, Ron. Que Publishing, 1999. Front Matter, Back matter, and pp. 4-13, 36-37, 106-111, and 122-133 included.*

Advanced Programming in the UNIX Environment. Stevens, W. Richard. Addison-Wesley, 1993. Front matter, back matter, and pp. 18-21 included.*

Sun Microsystems, Inc. Java Cryptography Architecture API Specification & Reference, Aug. 4, 2002, 56 pages.

Microsoft Software Piracy Protection "Product Activation Facts", at http://www.microsoft.com/piracy/activation_faq.mspx, Copyright 2005, 10 pages.

SIP.edu Cookbook, "SIP.edu and Avaya Converged Community Server", at http://mit.edu/sip/sip.edu/avaya.shtml, (Nov. 2004, Mar. 2005) 19 pages.

Avaya—"Product Support Notices (All Avaya Products): Product Support Notices", at http://support.avaya.com/japple/css/japple?temp.documentID=233413&temp.productID=1....undated, 2 pages; 2005.

Avaya—"Voice over IP Monitoring" at http://www.avaya.com/gcm/master-usa/en-us/products/offers/integrated_mgt_voip_monoto.... copyright 2005, 2 pages.

U.S. Appl. No. 11/222,997, filed Sep. 8, 2005, Rao.

Background of the Invention for the above-captioned patent application.

U.S. Appl. No. 10/956,861, Robinson.

ARSYS, "Public Key Infrastructure," (Feb. 4, 2001), available at http://www.transactiontrust.com/technicaindex.html, 4 pages.

Articsoft Limited, "Public Key Infrastructure (PKI) FAQs" (Feb. 2, 2003), available at http://www.articsoft.com/wp_pki_faq.htm, 5 pages.

"Digital Cinema Key Management Messages," Draft 1 (Aug. 8, 2002), pp. 1-9.

Entrust Inc., "Entrust Authority Security Manager," (printed Aug. 13, 2004), avaiable at http://www.entrust.com/authority/manager/index.htm, 23 pages.

Infosec Engineering, "Building a Corporate Public Key Infrastructure" (1999), available at http://www.infoseceng.com/corppki.htm, 20 pages.

LockStream Corporation, "Catalyst DRM Service Platform" (printed Aug. 13, 2004), available at http://www.lockstream.com/products_spcm.php, 1 page.

LockStream Corporation, "Lockstream KeyDRM" (printed Aug. 13, 2004), available at http://www.lockstream.com/products_1gm.php, 2 pages.

LockStream Corporation, "Lockstream OMA 1.0 DRM Client" (printed Aug. 13, 2004), available at http://www.lockstream.com/products_sprm.php, 2 pages.

LockStream Corporation, Catalyst DRM Service Platform Architecture, Vers, 1.0 (Nov. 2003), pp. 1-28.

Novell®, "Certificate Server: Public Key Infrastructure," White Paper (1999), pp. 1-10.

Russinovich, Mark, "Inside Encrypting Fily System, Part 1," Windows & .NET Magazine (Jun. 1999), available at http://www.winntmag.com/Articles/Index.cfm?ArticleID=5387&Key=Internals, 4 pages.

Russinovich, Mark, "Inside Encrypting Fily System, Part 2," Windows & .NET Magazine (Jul. 1999), available at http://www.winntmag.com/Articles/Index.cfm?ArticleID=5592&Key=Internals, 5 pages.

Security Config, Back Up Your Encrypting File System Private Key in Windows 2000 Download (Printed Aug. 13, 2004), avaiable at http://www.securityconfig.com/software/alerts/back_up_your_encrypting_file_system_private_key_in_windows_2000.html, 2 pages.

SSH Communications Security Corp., "Enabling Virtual Public Networks with Public Key Infrastructure," White Paper (Jan. 2004), pp. 1-9.

Streetman, Kibbee K. et al., "Public Key Infrastructure: Resources, Requirements and Recommendations," ATI IPT Special Report 00-06 (Apri. 20000), pp. 145.

Whatis.com Target SearchTM, "PKI" (Jan. 13, 2004), available at http://whatis.techtarget.com/definition/0,2989893,sid9_gci214299,00.html, 4 pages.

U.S. Appl. No. 10/775,498, filed Feb. 9, 2004, Gilman et al.

U.S. Appl. No. 10/811,412, filed Mar. 25, 2004, Walker.

U.S. Appl. No. 10/947,418, filed Sep. 21, 2004, Gilman et al.

Info Merchant Store website, "VeriFone 2000, MS/DUKPT/STD Pin Pad, New," (printed Feb. 17, 2007), available at http://www.merchantamerica.com/creditcardterminals/index.php?ba=product_enlarge&product=9632, 1 page.

VeriFone Inc. website, "VeriFone Payment Solutions: Point-of-Sale PINpads" (1997-2004), available at http://www.verifone.com/products/printers_peripherals/html/pinpad_family.html, 1 page.

ADTech Engineering, "IP Phone SI-160 User Manual (SCCP releases) Version 1.2," Document 92301-008-003 (2002), pp. 1-20.

"The Cricket Indoor Location System: An NMS Project @ MIT LCS" at http://nms.lcs.mit.edu/projects/cricket (Jul. 31, 2002), pp. 1-5.

Roger Clarke, "Centrelink Smart Card Technical Issues Starter Kit Chapter 7" (Apr. 8, 1998) at http://www.anu.edu.au/people/Roger.Clarke/DV/SCTISK.html. pp. 1-3.

Datakey, "Securing a Virtual Private Network with Smart Card Technology" available at www.datakey.com, pp. 1-8.

Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.

Griswold, Robert S., "Get Smart: The Coming Revolution of Smart Cards," Journal of Property Management (May/Jun. 1997), 5 pages.

Microsoft Corp., "Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_providers.asp (Aug. 2002), p. 1.

"Building an ISO7816-4 APDU Command" at http://msdn.microsoft.com/library/en-us/security/security/building_an_iso7816_4_apdu_command.asp (Aug. 2002), pp. 1-2.

"Vendor Wrapper Service Provider" at http://msdn.microsoft.com/library/en-us/security/security/vendor_wrapper_service_provider.asp (Aug. 2002), pp. 1-2.

Motorola Press Release, "ERG Motorola Alliance Receives Award for Smart Card" (Jun. 6, 2000), available at http://www.motorola.com/LMPS/pressreleases/page888.htm, 3 pages.

NEC Infrontia Corporation Press Release, "Establishment of 'SmartCardInfrontia' solutions for 'IC card'" (Mar. 13, 2002), available at http://www.necinfrontia.co.jp/english/company/press/2002/020313.htm, 4 pages.

NetLingo Dictionary of Internet Words, "Smart Card," (1995-2004), available at http://www.netlingo.com/lookup.cfm?term=smart+card, 2 pages.

Rankl, Wolfgang, "Smart Card Handbook." (Jun. 13. 2004). available at http://www.WRankl.de/SCH/SCH.html, 8 pages.

Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.

Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

Sun Developer Network, "Smart Card Overview," Sun Microsystems, Inc. 1994-2004, available at http://java.sun.com/products/javacard/smartcards.html, 2 pages.

Java Skyline: Java Servlet/Server Headline News, Oct. through Dec. 1998, pp. 1-3.

A. Menezes, P. van Oorschot and S. Vanstone, Handbook of Applied Cryptography, cr8523_01[1].pdf, Chapter 1, 48 pages.

A. Menezes, P. van Oorschot and S. Vanstone, Handbook of Applied Cryptography, cr8523_1 0[1 ].pdf, Chapter 10, 40 pages.

A. Menezes, P. van Oorschot and S. Vanstone, Handbook of Applied Cryptography, cr8523_12[1].pdf, Chapter 12, 53 pages.

"RightNow Technologies and MarketFirst Partnership Delivers Complete E-Marketing Solution", PR Newsire, Aug. 14, 2001, p. 1.

Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.

Kuchinskas, Susan, Keeping content safe is a big job and everyone has to do it: the security of its corporate content can make or break Topps. (Topps employs security consultant to watch network traffic), Jul. 2003, 2003 Online, Inc., pp. 1-5.

Multos Fights on, Jan. 2004, Thomson Media, Inc., pp. 1-7.

\* cited by examiner

GENERATION OF ENTERPRISE-WIDE LICENSES IN A CUSTOMER ENVIRONMENT

CROSS REFERENCE TO RELATED APPLICATION

This application claims the benefits under 35 U.S.C. §119 of U.S. Provisional Patent Application Ser. No. 60/615,432, filed Sep. 30, 2004, of the same title and to the same inventors, which is incorporated herein by this reference.

Cross reference is made to U.S. patent application Ser. No. 10/231,957, filed Aug. 30, 2002, entitled "Licensing Duplicated Systems"; Ser. No. 10/232,507, filed Aug. 30, 2002, entitled "License File Serial Number Tracking"; Ser. No. 10/232,508, filed Aug. 30, 2002, entitled "License Modes in Call Processing"; Ser. No. 10/231,999, filed Aug. 30, 2002, entitled "Flexible License File Feature Controls"; Ser. No. 10/232,906, filed Aug. 30, 2002, entitled "Remote Feature Activator Feature Extraction"; Ser. No. 10/232,647, filed Aug. 30, 2002, entitled "Software Licensing for Spare Processors"; Ser. No. 10/348,107, filed Jan. 20, 2003, entitled "Remote Feature Activation Authentication File System"; Ser. No. 10/387,182, filed Mar. 11, 2003, entitled "Temporary Password Login"; Ser. No. 10/811,412, filed Mar. 25, 2004, entitled "Global Positioning System Hardware Key for Software Licenses"; and Ser. No. 10/956,861, filed Sep. 30, 2004, entitled "Certificate Distribution Via License Files", each of which is incorporated herein by this reference.

FIELD OF THE INVENTION

The invention relates generally to software and/or hardware and particularly to enterprise-wide licensing.

BACKGROUND OF THE INVENTION

In the licensing of software for an enterprise, there is a need to issue the customer a license for software that specifies the number of users or simultaneous instances of the software the enterprise is allowed to have. Once the customer has the license for the enterprise, there is a need for the customer to be able to use the enterprise license to activate users/software instances while keeping the users/software instances within the limits of the enterprise license. This needs to be performed in the customer's environment without communication with the software vendor so that the customer can operate autonomously within the bounds of the enterprise license. For example, if the enterprise license allows 100 copies of the software to run at a time, the customer needs to be allowed to activate 100 instances of the software while being blocked from activating the 101st instance of software. For many applications, constant network communication with the enterprise license server is not possible or practical. Therefore, the licenses generated for users/software instances need to be persistent and continue to operate even when contact with the enterprise license server is lost or otherwise not available. This is the case with telecommunications enterprise-wide licensing where the licensing of mission critical voice communication systems needs to continue unabated even if communication to the enterprise license server is lost.

One licensing method is described in copending U.S. patent applications entitled "Securing Feature Activation in a Telecommunication System", Ser. No. 09/357,679, filed Jul. 20, 1999, to Serkowski; "Securing Feature Activation in a Telecommunication System", Ser. No. 09/357,679, filed Jul. 20, 1999, to Serkowski; "License Modes in Call Processing", Ser. No. 10/232,508, filed Aug. 30, 2002; "Remote Feature Activator Feature Extraction", Ser. No. 10/232,906, filed Aug. 30, 2002; "Flexible License File Feature Controls", Ser. No. 10/231,999; "License File Serial Number Tracking", Ser. No. 10/232,507; "Licensing Duplicated Systems", Ser. No. 10/231,957; "Software Licensing for Spare Processors", Ser. No. 10/232,647; "Temporary Password Login", Ser. No. 10/387,182; and "Ironclad Notification of License Errors", Ser. No. 10/405,176; each of which is incorporated herein by this reference, and is currently being implemented commercially in Communication Manager™ by Avaya Inc.™ A valid license file is required to run a computational component. The license file contains a hardware serial number that must be present on the hardware that is to execute the licensed software for the license to be valid and the software to be executable. This hardware serial number confirms that a single license is used to enable a single instance of software. This licensing method requires the licensed application to be in continuous contact with the enterprise license server. The license server issues a license that must be updated or checked periodically (such as once every 10 minutes).

There are different solutions that may be employed when a license fails an update or check. If the license update or check is not possible (such as due to loss of network communications), the license server may release the license and make the user seat/software instance available for use by another user. On the application side, if the license update or check fails, the application either continues to run with an alarm or stops operation. If the application continues to run without a license update or check, then there is a potential for license abuse since the same license can be used multiple times. If the application ceases to operate due to a failed license update or check, the software user is denied service, even though a seat/software instance is available. Neither of these solutions is satisfactory in most situations.

In the licensing of software for an enterprise, there is a further need to track licensing information at both the enterprise and individual software element levels. For example, the total number of ports for a telecommunications system may be tracked at the enterprise level, whereas platform type, serial number, and individual software feature right-to-use settings may need to be tracked at the lower level of an individual software element. In addition to tracking licensing information at both the enterprise and software element levels, a method is needed for establishing a relationship between the individual software elements and the license record for the enterprise to which they belong. For maximum flexibility in the software licensing options that a software company may want to offer their customers, software licensing parameters (e.g., software release, individual features, and capacities) need to be controllable at either level. Ideally, a method would be provided to allow moving an individual licensing parameter on a specific licensed system from one level to the other.

SUMMARY OF THE INVENTION

These and other needs are addressed by the various embodiments and configurations of the present invention. The present invention is directed generally to customer-configurable enterprise-wide licensing techniques and data structures used therewith.

In a first embodiment, the present invention provides a customer with a first set of enterprise licensable features and/or capacities and a second set of non-enterprise licensable features and/or capacities. The enterprise licensable features and/or capacities, but not non-enterprise licensable features and/or capacities, are allocable freely by the customer among the various computational components of the enterprise network. For example, a customer can distribute an enterprise feature and/or feature capacity among the computational components in the enterprise in a first manner and later redistribute them in a second different manner. By paying a higher fee than is paid for a non-enterprise or single system license, the customer can purchase the right to designate members for the enterprise licensable features and/or capacities and allocate them among the enterprise computational components in whatever manner he desires. After payment of appropriate charges, a feature becomes an enterprise feature, and the customer can move freely such features and/or capacities between the enterprise and non-enterprise licensable feature and/or capacity sets. For example, a customer can pay for the right to designate ten features and/or capacities as enterprise licensable features and can elect at different times to have different features and/or capacities as designated members of the ten features and/or capacities.

In another embodiment, persistent licenses are generated in the customer telecommunications environment to solve the problem of licensing operation during loss of communication with the master license server. An enterprise license for the customer's enterprise is generated by and delivered from a remote feature activation system of the manufacturer. The enterprise license is then installed on a customer master license server. The customer can allocate features and capacities to enterprise media servers, and the remote feature activation system or master license server generates licenses for the media servers that reflect the allocations. Once generated, these allocation licenses are installed on the media servers. The allocation licenses are persistent in that they do not require periodic updates from the master license server, and the media servers continue to operate even if communication is lost with the license server. The capacity allocated to a given media server is not returned for use by other media servers unless a new allocation license is installed on the media server with the capacity removed. Using this methodology, communication between the master license server and the licensed application is required only when license changes are needed. During a network outage, allocation license changes cannot be made but the allocation licenses persist through the outage. Moreover, allocation license generation in the customer enterprise is possible without contact with the software vendor/manufacturer, and enterprise license limits can be readily enforced.

This approach to enterprise licensing may be susceptible to license abuse unless proper security measures are in place. These security measures include two-way authentication between the remote feature activation system/master license server and media server using PKI certificates, node locking for the master license server to a specific instance of hardware, and node locking the allocation licenses to specific media server hardware.

In yet another embodiment, hierarchical relationships between system records (for individual hardware and/or software elements) and enterprise records (for the entire customer enterprise or a collection of hardware and/or software elements) are established via linking/unlinking system records to/from enterprise records. When a new software element is added (linked) to an enterprise, for example, all of the features/capacities present on the system record of the newly linked element are added to the licensing record for the enterprise. By way of illustration, if a system record with 100 ports is linked to an enterprise that currently has 1,000 ports, the enterprise record is updated automatically to reflect a total of 1,100 ports available across the enterprise. This automated ability to promote features to the enterprise level when system records are linked to enterprise records can ensure that the customer is given all of the features/capacities to which they are entitled. Such entitlements can be due to purchases at either the software element or enterprise level. The removal (unlinking) of a software element from an enterprise is a reverse of the process described (i.e., the features and capacities in the unlinked system record are subtracted from the enterprise record). The linking/unlinking of records allows customers to freely move individual software elements in and out of enterprises or even between enterprises. It provides the flexibility to control individual license parameters at either the system record or the enterprise record level. For a license parameter to be controlled at the enterprise level, it need only appear in the enterprise record. License parameters that appear only at the system record level are controlled at the level of the associated software element. If a license parameter should appear at both levels, it is handled as noted above with regard to linking and unlinking of records. The ability to support an individual licensing parameter as both a system record parameter and an enterprise record parameter allows features to be offered to customers at either the enterprise or software elements levels. Additionally, with the capability of moving an individual feature for an individual customer between levels, customers have maximum flexibility in software licensing. For example, a customer with an enterprise license can add a new software feature or capacity to the enterprise record and automatically promote this feature, as it appears in the linked system records, to an enterprise feature.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Remote Feature Activation System

Figure 1:
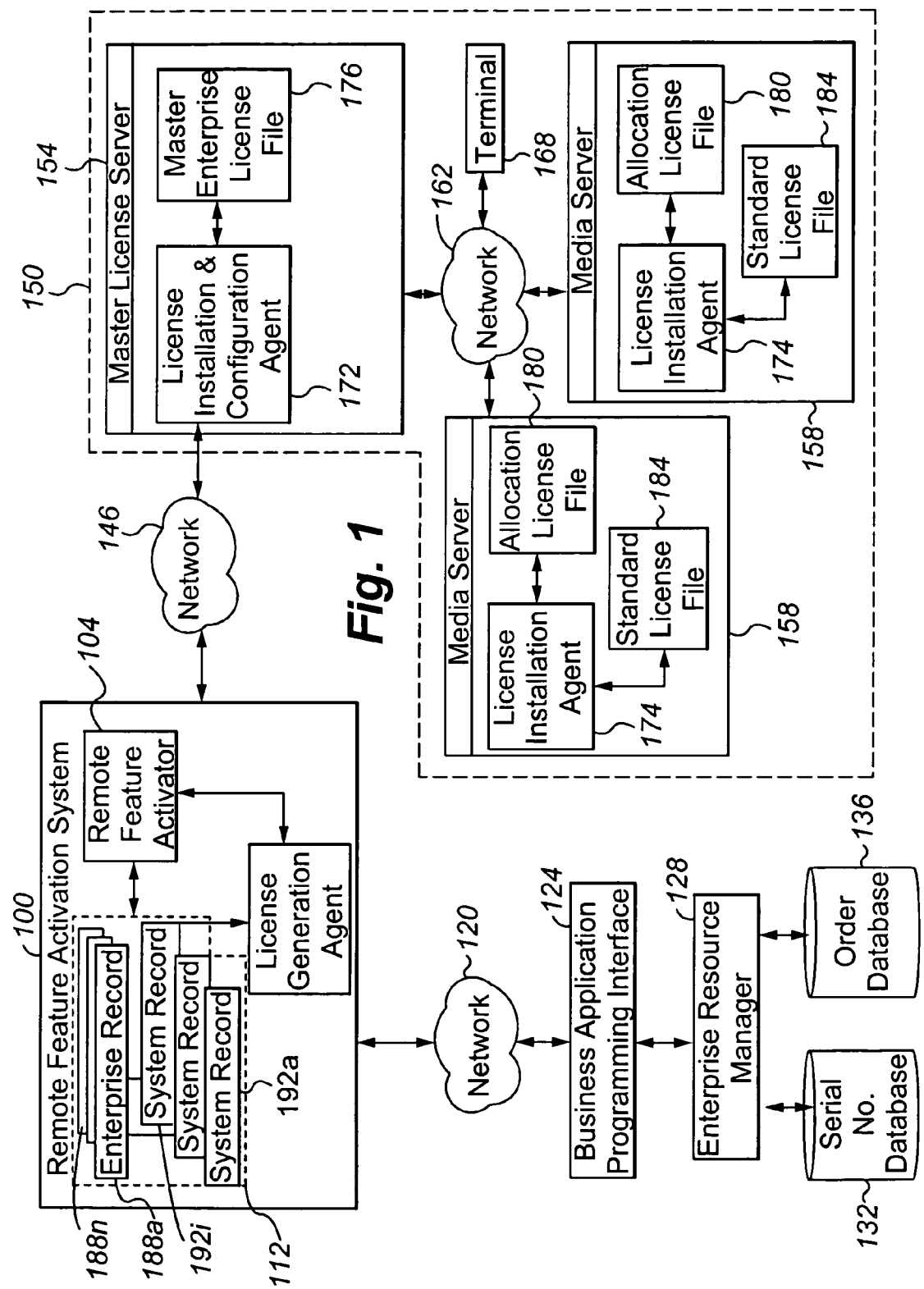
FIG. 1 depicts an architecture according to an embodiment of the present invention.

Referring to FIG. 1, the remote feature activation or RFA system 100 comprises a remote feature activator 104 to supervise creation, encryption and delivery of master enterprise license files to enterprise master license servers, a license generation agent 108 that generates digitally signed standard and master license files (and in one implementation allocation license files) in response to requests from the RFA system 104, and a plurality of data structures 112, each of which corresponds to a licensed customer enterprise network. A cryptographic agent (not shown) generates public/private key pairs that are included in the master and/or standard license files.

The RFA system 100 is in communication, via network 120 and business application programming interface 124, with an enterprise resource manager 128, serial number database 132, and an order database 136. The operation of the ERM 104 is discussed in detail in copending U.S. application Ser. No. 10/232,507 entitled "License File Serial Number Tracking". The ERM 104 is configured to cause the addition, update, modification, and validation of entries in the databases 132 and 136 based on predetermined rules or policies. The ERM 104 can be any suitable enterprise resource planning software, such as ERP or Enterprise Resource Planning™ software sold by SAP. The serial number database 132 comprises a plurality of records corresponding to hardware (e.g., processors or IP services interface cards) sold to customers. In particular, the database typically includes a serial number, serial number status or licensing state, client or purchaser, material code(s) (e.g., a material code in SAP that defines the hardware having the serial number), an Enterprise System ID or ESID that identifies uniquely the enterprise that is the subject of the record, a System (record) ID or SID that identifies a system defined by one or media servers, and a Module ID or MID that identifies a media server in a system. The combination of the SID and MID identify uniquely a media server in a network. The order database comprises a plurality of records associated with hardware and software corresponding to each customer order. Each order entry typically includes an order number, customer name, address, and contact information, and a series of quantity, material code, and description fields identifying the contents of each order. The databases and their associated data structures are further described in copending U.S. patent application Ser. No. 10/232,906, filed Aug. 30, 2002, entitled "Remote Feature Activator Feature Extraction".

The data structures 112 include a plurality of enterprise records 188a-n, each of which corresponds to a different enterprise network. Each of the enterprise records 188a-n is linked to a plurality of corresponding system records 192a-i, and defines the customer's enterprise licensing information including the enterprise feature capacities. A system record is a database record that defines the licensing information for a customer media server. The system record is identified by the SID with which the media server corresponding to the system record is identified. Material code mapping tables are used to convert customer orders into licensing records and provide controls to define, for each licensing parameter, whether it applies to system records, enterprise records, or both.

The enterprise record typically includes the following information: the ESID corresponding to the associated enterprise, customer and general information, and enterprise information (e.g., enterprise description, location of the master license server 154, unique hardware identification number for the master enterprise license file (e.g., the host identifier or Media Access Control or MAC address of the master license server 154), the licensed applications, the enterprise features and capacities for each licensed application, the expiration date(s) of the license(s)), the master enterprise license file delivery history, and the SIDs (e.g., the pointers to the various system records for the media servers included in the enterprise).

Each system record commonly includes the following information: the ESID for the corresponding enterprise (which acts as a pointer to the corresponding enterprise record for that enterprise), a unique hardware identifier of (Media Access Control address of and/or serial number of the processor associated with) the corresponding media server, the SID assigned to the media server corresponding to the system record, and the media server identifier (MID) within the system identified by the SID, the licensed enterprise and non-enterprise applications, the enterprise and non-enterprise features and settings for each of the licensed applications, and the expiration date(s) of the license(s).

Type I, II, and III features are eligible for enterprise wide licensing. As discussed in copending U.S. application entitled "Flexible License File Feature Controls", the three types of features are: Type I features (which are activatable), Type II features (which have a value feature range defined numerically by V1 and V2 and a value setting in the range of V1 to V2), Type III features (which have a product value (e.g., corresponding to a product name or type), a release number (e.g., referring to a product release identifier), and numeric value(s) defined by V1 and V2, and a value setting in the range of V1 and V2). A Type III feature allows other applications to be executed. Examples of Type I features include abbreviated dialing enhanced list, audible message waiting, vectoring, answer supervision by call classifier, ATM trunking, agent states, dial by name, DCS call coverage, echo cancellation, multifrequency signaling, wideband switching, Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless. Examples of Type II features include logged-in agents, offer category, maximum numbers of concurrently registered IP stations, administered IP trunks, ports, and concurrently administered remote office stations/trunks, call center release, logged-in automated call distribution or ACD agents, maximum currently registered IP stations, maximum administered IP trunks, offer category, maximum number of ports, maximum number of administered remote office trunks, and maximum number of mobile stations. Examples of Type III features include IP softphone registration.

The linkage of system records to enterprise records permits licensing records to be maintained at two different levels, namely the enterprise and computational component or media server levels. Stated another way, a hierarchical relationship is established between the enterprise record 188 and its corresponding system records 192a-i. The relationship permits enterprise administrators or customers to promote/demote features and/or capacities between the enterprise and non-enterprise levels. In other words, a selected feature and/or capacity for a first customer can be an enterprise level feature and/or capacity, and for a second customer can be a non-enterprise level feature and/or capacity.

The logical relationships or links are established pursuant to a number of rules including: a given system record shall be linked to no more than a single enterprise record, a given enterprise record can have any number of system records linked to it, a system record is linked to an enterprise record only if the system record is eligible for enterprise-wide licensing, and a system record can only be linked to an enterprise record if one or more of the applications in the enterprise record are present in the system record.

Figure 2:
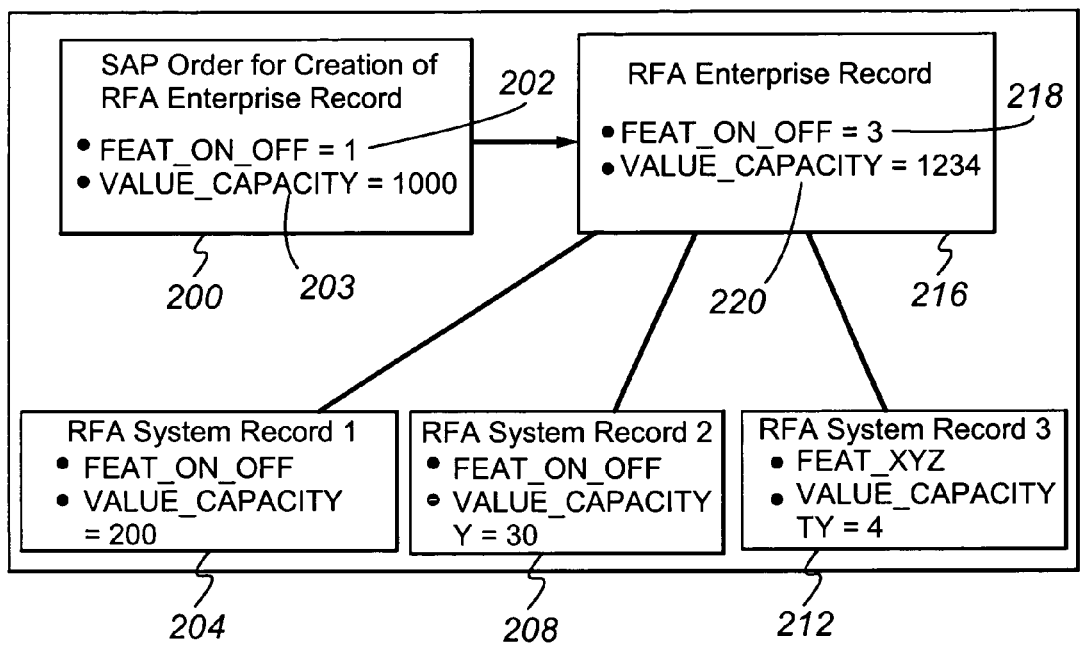
FIG. 2 depicts a set of data structures according to an embodiment of the present invention.

Because of the logical relationships established between enterprise and system records when a new system element, such as a media server, is added to an enterprise and its associated system record linked to the enterprise record, all of the features/capacities present on the system record of the newly linked element are added to the licensing record for the enterprise. This concept is illustrated in FIG. 2. When the enterprise record 200 was originally created the enterprise feature FEAT_ON_OFF 202, which is an activatable enterprise feature, had a value of 1 and the capacity enterprise feature VALUE_CAPACITY 203 a value of 1000. It is later linked to three system records 204, 208, and 212 and, as a result, the originally assigned values are adjusted in the modified enterprise record 216. The value for the feature 202 is the value in the original enterprise record 200 incremented by 1 for each linked system record that has the same feature activated. The feature is activated in system records 204 and 208, but the feature is absent from system record 212. Accordingly, the new value 218 for the feature is 3. The value for the capacity enterprise feature 203 in the modified enterprise record 216 is the value from the original enterprise record 200 plus the values from each system record in the enterprise that has the capacity feature. As can be seen in FIG. 2, each of the linked system records 204, 208, and 212 has the same enterprise capacity feature, with the value in record 204 being 200, the value in record 208 being 30 and the value in record 212 being 4. The mathematical sum of these values is 1234 as shown in the modified enterprise record 216. It is important to note that FEAT_XYZ is a non-enterprise feature and therefore is absent from the enterprise record 200 and 216. Its presence in the linked system record 212 thus has no impact on the enterprise record, even if FEAT_XYZ is an enterprise feature in other enterprise records. Features are added to the enterprise record only via a customer order.

The Enterprise Network

The RFA system 100 is further in communication, via network 146, with an enterprise network 150. The enterprise network 150 includes a master license server 154 and a plurality of media servers 158, respectively, a network 162, and a terminal 168.

The media servers 158 can be any converged architecture for directing circuit-switched and/or packet-switched contacts to one or more communication devices. Typically, the media server is a stored-program-controlled system that conventionally includes interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the media server can be a modified form of Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya, Inc.'s Communication Manager™ voice-application software with call processing capabilities and contact center functions. Other types of known switches and servers are well known in the art and therefore not described in detail herein. The media servers 158 can server a variety of functions, including acting as a main server, local spare processors, remote spare processor, WAN spare processor, primary port network or PPN, and enterprise survivable server or ESS.

The master license server 154 can be any system operable to install and distribute licenses. Typically, the master license server 154 is a media server having network connectivity to the remote feature activation provisioning system 100.

The terminal 168 is a computer, such as a laptop or PC, that is connected to the media servers for user administration of the various system elements in the enterprise network. Administration includes the creation and distribution of allocation licenses as discussed more fully below.

The networks 120, 146, and 162 can be packet-switched and/or circuit-switched. Typically, networks 120 and 162 are local area networks while network 146 is a wide area network, such as the Internet.

The media servers 158 include a license installation agent 174 to receive and install standard and enterprise allocation license files, and the master license server 154 includes a license installation and configuration agent 172 that receives from the remote feature activation system 100 and installs on the server 154 standard and master enterprise license files 184 and 176 and forwards standard license files 184 and generates and forwards enterprise allocation license files 180 to media servers 158. In the configuration of FIG. 1, for example the remote feature activation system 100 could provide four licenses files to the master license server 154, namely the master enterprise license file 176 and three standard license files 184, one for each of the license server 154 and media servers 158. As will be appreciated, the standard licenses may be distributed by enterprise administration/the remote feature activation system 100 manually and/or independently of the master license server 154.

The master enterprise license file 176 defines the total enterprise feature capacities for the enterprise. The master enterprise license file 176 includes the following information: the ESID for the enterprise network 150, unique hardware identifier of (Media Access Control address of and/or serial number of the processor associated with) the master license server 154 in the corresponding enterprise network 150, the SIDs and MIDs of the various media servers in the enterprise network 150, the licensed enterprise applications, the enterprise features and settings for each of the licensed enterprise applications, and the expiration date(s) of the licenses. The master enterprise license file and standard license files include the features and maximum feature capacities that can be allocated to primary and media servers in the licensed enterprise. Because the enterprise licensable features are not associated with a single media server, the enterprise has portability of the capacities between all the media servers in the enterprise. The license files include a numerical value setting corresponding to the number of media servers in the enterprise on which the customer is allowed to have each of the Type I features activated and a numerical value corresponding to the total enterprise capacity that the customer is allowed to have for each Type II and III capacity features. As will be appreciated, the standard license file can be merged into the master enterprise license file so that only a single license file is installed on the master license server.

The standard license file enables the telecommunications application to run on each of the computational components in the enterprise network 150. The standard license file enables the host computational component software to run and enables enterprise wide licensing on a given media server. The standard license file is required by computational components whether or not they participate in enterprise-wide licensing.

Figure 3:
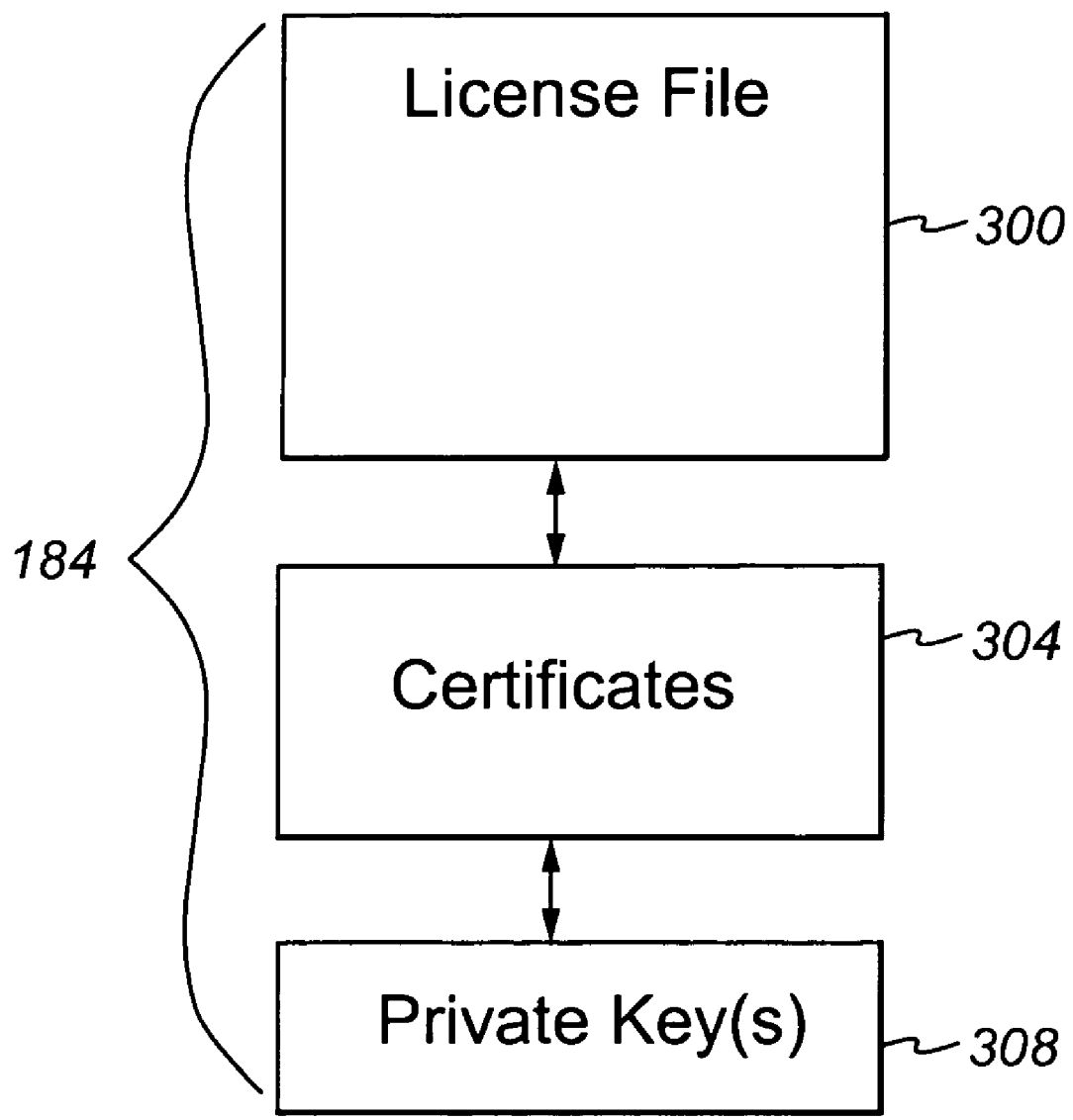
FIG. 3 depicts a standard license file according to an embodiment of the present invention.

FIG. 3 represents, at a high level, both the master enterprise license 176 and the standard license 184. The enterprise license 176 typically includes, in the license file 300: the ESID of the enterprise network 150, the unique hardware identifier of the master license server 154, the SIDs, MIDs, and hardware identifiers of the various media servers in the enterprise network 150, the licensed enterprise applications, the enterprise features and settings for each licensed enterprise application, and the expiration date(s) of the license. As will be appreciated, the master license server may be co-resident on a media server. The standard license 184 typically includes, in the license file 300, the ESID, the SID, and MID of the licensed media server, the licensed enterprise and non-enterprise applications, features, and settings, and the license expiration date. Both types of licenses further include the digital certificates 304 for each of the identified computational components containing the public key, and the private key 308 corresponding to each of the public keys in the certificates 304. As will be further appreciated, when the standard license files are delivered to each of the media servers 158, the standard licenses are generally different. The standard license file delivered to each of the media servers 158 includes only the corresponding media server's SID, MID, and hardware identifier, digital certificate, and associated private key for that media server.

The enterprise allocation license file 180 defines the enterprise features and feature capacity allocations for the host media server. The allocation license file typically includes the following information: the ESID for the enterprise network 150, the unique hardware identifier of the master license server 154, the SID and MID of the corresponding media server 158, the licensed enterprise applications for the corresponding media server 158, the allocated enterprise features and settings for each of the licensed enterprise applications in the corresponding media server 158, the expiration date of the allocation license. Allocation license files are given an expiration date, such as thirty days after generation, to prevent use of the software in violation of the license terms. Periodically, the master license server and/or remote feature activation system must generate and install a new allocation license good for thirty more days.

Although the master enterprise and enterprise allocation license files on the one hand and the standard license files on the other include the enterprise features and feature capacity allocations, the feature and feature capacity allocations in the master enterprise and enterprise allocation license files take precedence in the event of conflict with or supersede the information for the enterprise features and feature capacity allocations in the standard license files. This rule permits a customer to move freely features and feature capacity allocations to and from the enterprise and non-enterprise levels.

To facilitate user configuration of the allocation licenses, the agent 172 provides a Graphical User Interface or GUI to the user. The GUI permits the user to view information in the master enterprise license file, such as the ESID, SIDs, MIDs, expiration date of the master enterprise license file, applications covered by the master enterprise license file, enterprise feature states (whether the feature is enabled or disabled), values, and capacities, and allocation license duration. The user can further view the number of media servers in the enterprise with each Type I on/off (or activatable) enterprise feature currently activated, the available quantity remaining for each activatable enterprise feature, the total allocated capacity for each enterprise capacity feature, the available capacity remaining for each enterprise capacity feature, and the percent utilization for each enterprise feature. For the displayed usage level for each enterprise capacity feature, the GUI provides the date/time that the usage data was collected. The GUI enables the user to allocate enterprise features and capacities to any of the media servers in the licensed enterprise network subject to a number of selected rules. The rules include: the total number of media servers with a given activatable enterprise feature activated cannot exceed the value defined in the master enterprise license file, the total allocated capacity for each enterprise capacity feature cannot exceed the total capacity for that feature as defined in the master enterprise license file, allocated enterprise feature capacity cannot be less than current usage for that feature on a media server, enterprise feature capacity can only be allocated to a system whose SID appears in the master enterprise license file, the allocation of enterprise features and capacities to spare media servers in a system shall be identical to the allocation to the corresponding main media server, and the calculation of the total allocation for a given feature shall be based only on the allocations to main servers (or the allocation to spare media servers shall not be counted against the total allocation for the enterprise).

Other aspects of the architecture are described in the copending applications referenced above and incorporated herein by this reference.

Figure 4:
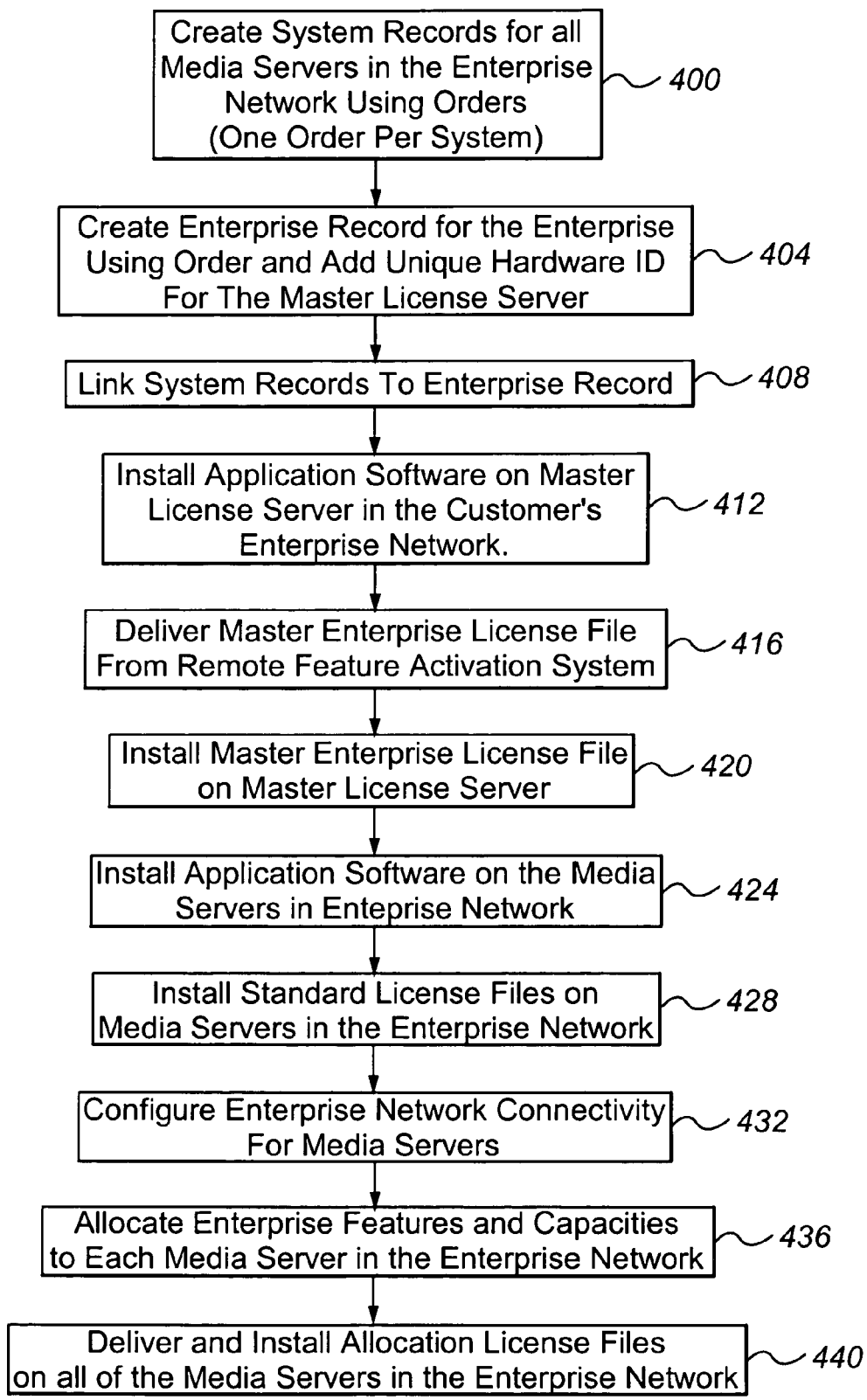
FIG. 4 is a flowchart according to an embodiment of the present invention.

Process for Generating and Installing Standard and Master Enterprise License Files on Master License Server The process for generating and installing standard and master enterprise license files on the master license server 154 will now be described with reference to FIGS. 4-5.

In step 400, the remote feature activation system 100 creates system records for all servers 154 and 158 in the enterprise network 150 using orders (one order per system record). A unique hardware ID, such as a processor serial number, is added to each system record.

In step 404, the system 100 creates an enterprise record for the enterprise using an order and adds to the record the unique hardware identifier associated with each master license server.

In step 408 the system records are linked to the corresponding enterprise record. After the records are linked, the standard and master enterprise license files are generated by the license generation agent 108.

In step 412, the application software (e.g., Avaya Inc.'s Communication Manager™ or Multi-Vantage™ software) is installed on the master license server 154. As part of this step and where the master license server is co-resident on a media server, the remote feature activator 104 delivers the standard license file 184 to the license installation and configuration agent 172 in the master license server 154 and the agent 172 unpackages and installs the standard license file 184 so that the master license server can run the application software. The master license server 154 is selected to have network access to all of the media servers in the enterprise network.

In step 416, the activator 104 delivers the master enterprise license file 176 to the license installation and configuration agent 172 in the master license server 154.

In step 420, the agent 172 unpackages and installs the master enterprise license file 176. The installation process is discussed below with reference to FIG. 5.

In step 424, after the master license server 154 is enabled by the installed master enterprise license file the application software is installed on the media servers 158.

In step 428, an appropriate standard license file 184 is delivered to the license installation agent 174 in each of the media servers 158. The agent 172 unpackages and installs the standard license file 184 so that the application software can run. To generate an allocation license file, the agent 172, after receiving input from the customer, generates in one configuration an allocation license request and forwards the request to the remote feature activation system 100, where an allocation license is generated by the license generation agent 108. Allocation license requests include the ESID for the enterprise 150, the SID and MID associated with the media server that will be the subject of the allocation license, the expiration date of the allocation license, and the enterprise feature allocations and settings, including those requested by the customer. The request includes all of the active features contained in the master enterprise license file. In the feature mask of the allocation license file, Type I feature settings are locked and Type II and III feature settings have V1 equal to V2. In another configuration, the agent 172 generates allocation license files without involvement of the remote feature activation system 100.

In step 432, enterprise network connectivity is configured for the media servers using techniques known to those of ordinary skill in the art.

In step 436, enterprise features and capacities are allocated by the customer to each of the primary media servers in the enterprise network 436. In response to user input, the license installation and configuration agent 172 in the master license server 154 generates appropriate allocation license files 180 for each of the affected media servers. The process to install an allocation license file 180 on a media server is discussed below with reference to FIG. 6.

Installation of the Master Enterprise License File on the Master License Server

Figure 5:
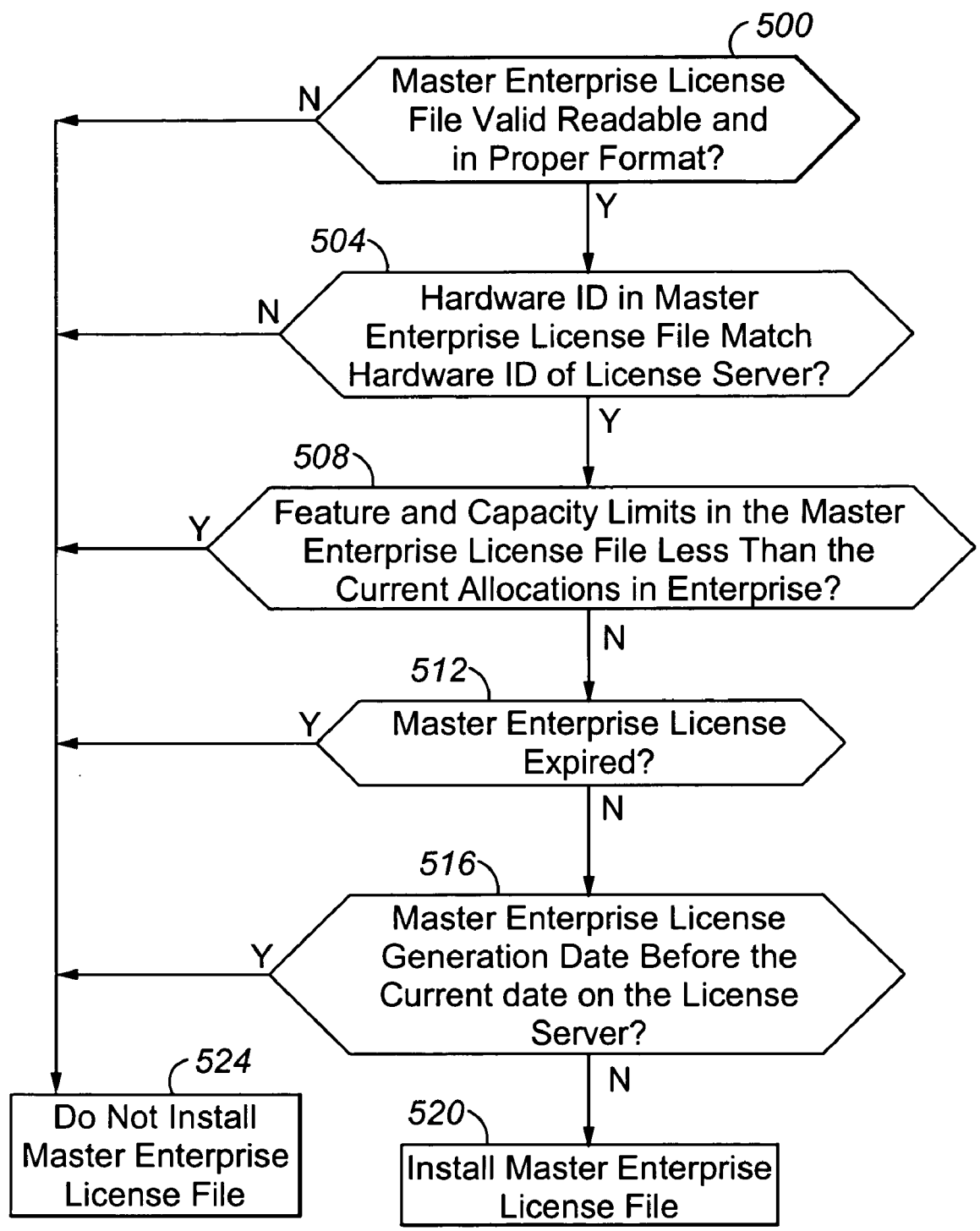
FIG. 5 is a flowchart according to an embodiment of the present invention.

FIG. 5 depicts the steps performed by the license installation and configuration agent 172 to install the master enterprise license file.

When the file is received, the agent 172 unpackages the license file and, in decision diamond 500, determines whether the license file is valid, readable, and in the proper format.

When the license file is valid, readable, and properly formatted, the agent 172 in decision diamond 504 determines whether the hardware ID in the file matches the hardware ID of the license server 154.

When the hardware ID's match, the agent 172 in decision diamond 508 determines whether the feature and capacity limits in the master enterprise license file are less than the current allocations in the enterprise network 150.

When the feature and capacity limits are not less than the current allocations, the agent 172 in decision diamond 512 determines whether the master enterprise license has expired. This is done by comparing the expiration date in the license file with the system clock of the license server.

When the license is not expired, the agent 172 in decision diamond 516 determines if the license generation date is before (within some tolerance) the current date on the system clock of the license server 154.

If so and after all of the other checks are successful, the agent 172 finds in step 520 the installation of the master enterprise license file to be successful.

When any of the checks is not successful, the agent 172 finds in step 524 the installation of the master enterprise license file to be unsuccessful.

Distribution of Allocation License Files

Figure 6:
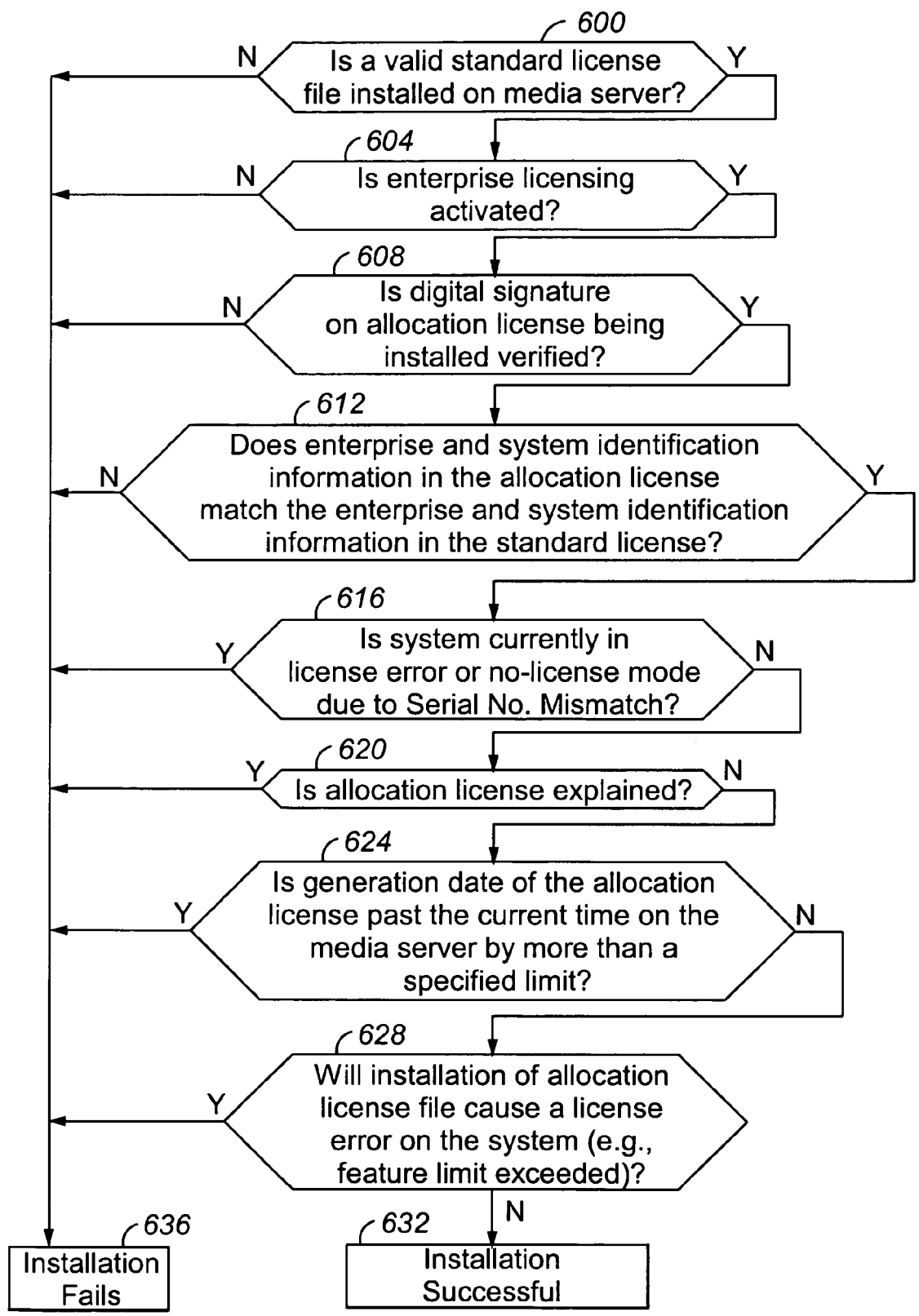
FIG. 6 is a flowchart according to an embodiment of the present invention.

The distribution of allocation license files will now be discussed with reference to FIG. 6. The figure assumes that the allocation license file has been received by an agent 174 in a media server 158. Although these steps are described as being performed by the agent 174, they could alternatively or additionally be performed by the agent 172 in the master license server before distribution to the media server identified in the license file.

In decision diamond 600, the agent 174 determines whether the corresponding media server already has installed a valid standard license file 184.

When a valid standard license file 184 exists, the agent 174 in decision diamond 604 determines whether enterprise licensing is activated in the standard license file 184.

When enterprise licensing is activated, the agent 174 in decision diamond 608 determines whether the digital signature on the allocation license file is valid. This is done by decrypting the digital signature using the public key in the public certificate of the digitally signing entity, which is commonly the remote feature activation system 100 and confirming that the decrypted hash value is correct.

When the digital signature is verified successfully, the agent 174 in decision diamond 612 determines whether the enterprise and system identification information (e.g., ESID, SID, and MID of the media server) in the allocation license match the enterprise and system identification information in the standard license 184.

When the enterprise and system identification information matches the same information in the standard license 184, the agent 174 in decision diamond 616 determines whether the system is currently in a license-error or no-license mode due to a hardware ID mismatch.

When the system is not currently in a license-error or no-license mode, the agent 174 determines in decision diamond 620 whether the allocation license is expired.

When the allocation license is not expired, the agent 174 in decision diamond 624 determines whether the generation date of the allocation license is past the current time on the media server by more than a specified limit.

When the generation date of the allocation license is not past the current time on the media server by more than a specified limit, the agent 174 in decision diamond 628 determines whether installation of the allocation license file will cause a license error on the system. For example, a license error can be caused by a feature limit being exceeded. When a feature and/or capacity limit will be exceeded, the customer must increase the feature and/or capacity limit in the allocation license file for the media server.

If so and after all of the other checks are successful, the agent 174 finds in step 632 the installation of the allocation license file to be successful.

When any of the checks is not successful, the agent 174 finds in step 636 the installation of the master enterprise license file to be unsuccessful.

A number of variations and modifications of the invention can be used. It would be possible to provide for some features of the invention without providing others.

For example in one alternative embodiment, the various modules referenced herein are implemented as software, hardware (e.g., a logic circuit), or a combination thereof.

In another alternative embodiment, the division of the various functions performed by the various modules in the enterprise licensing system is different.

In other embodiments, the present invention is used to license computational components, such as software and/or hardware, distributed in an enterprise network other than media servers. Examples of such components include personal computers, laptops, packet-switched and/or circuit-switched communication devices, such as IP hardphones, digital phones, and Personal Digital Assistants, gateways, voice messaging servers, instant messaging servers, email servers, adjunct processors, and peripherals (such as printers).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
creating, by a remote feature activation system including a processor, an enterprise record corresponding to an enterprise network and first, second, and third system records corresponding to first, second, and third computational components, respectively, in the enterprise network, the first, second, and third system records having first, second, and third system capacities, respectively, for an enterprise-level licensable feature and fifth, sixth, and seventh system capacities, respectively, for a non-enterprise-level licensable feature, wherein the first, second, and third capacities for the enterprise-level licensable feature are freely transferable, by a customer, to any of the first, second, and third computational components, and wherein the fifth, sixth, and seventh non-enterprise level licensable capacities are not freely transferable, by the customer, to another of the first, second, and third computational components;
during a first time interval, associating, at a first request of the customer, with the enterprise record, and by the remote feature activation system, the first and second system records;
during the first time interval, creating and delivering, by the remote feature activation system, a first master license to the enterprise network, the first master license governing and permitting a total capacity for the enterprise-level licensable feature in the enterprise network that is at least the sum of the first and second system capacities;
during the first time interval, creating and delivering first and second standard licenses to the first and second computational components, respectively, the first and second standard licenses having respective ones of the first, second, fifth, and sixth system capacities, wherein the first and second standard licenses include feature and maximum feature capacity information;
during a second time interval, associating, at a second request of the customer, with the enterprise record, and by the remote feature activation system, the first and third system records, but not the second system record;
during the second time interval, creating and delivering, by the remote feature activation system, a second master license to the enterprise network, the second master license permitting a total capacity for the enterprise-level licensable feature in the enterprise network that is a sum of at least the first and third system capacities, the sum excluding the second system capacity, wherein at least one of the first and second master licenses replaces the other of the first and second master licenses; and
during the second time interval, creating and delivering a third standard license to the third computational component, the third standard license including the third and seventh system capacities.

2. The method of claim 1, wherein a customer has the ability, without contacting either a software vendor or manufacturer, to associate the enterprise record with either or both of the first and second system records, wherein the second master license replaces the first master license, wherein the enterprise record has an enterprise capacity, wherein the first master license permits a total capacity that is at least the sum of the enterprise and first and second system capacities; and wherein the second master license permits a total capacity that is at least the sum of the enterprise and first system capacities but that excludes the second system capacity.

3. The method of claim 1, wherein the enterprise network comprises a second network segment, wherein the first and second system records have first and second system record identifiers, respectively, wherein the enterprise record has a corresponding enterprise identifier, wherein, during the first time interval, the first and second system record identifiers are linked to the enterprise identifier and wherein, during the second time interval, the first, but not the second system identifier, is linked to the enterprise identifier, wherein the second master license replaces the first master license, and further comprising:
during the second time interval, associating, with a second enterprise record corresponding to the second network segment, the second system record; and
during the second time interval, generating and delivering a third master license for the second network segment, the third master license permitting a total capacity that includes at least the second system capacity but excludes the first system capacity.

4. The method of claim 1, wherein the first and second system records each comprise a pointer to a corresponding enterprise record, a hardware identifier, a respective system identifier, a listing of system-level licensed applications, a listing of features and capacities for each licensed application, and a license expiration date, wherein the first and second system records have first and second system record identifiers, respectively, wherein the enterprise record has a corresponding enterprise identifier, and wherein the enterprise record comprises an enterprise identifier, customer information, enterprise information, a listing of licensed applications, a listing of enterprise-level features and capacities for each licensed application, a license expiration date, and pointers to one or more associated system records and wherein the first and second computational components are media servers and the first and second system records each comprise a set of licensed enterprise features and/or capacities comprising a plurality of the following: abbreviated dialing enhanced list, audible message waiting, vectoring, answer supervision by call classifier, ATM trunking, agent states, dial by name, DCS call coverage, echo cancellation, multifrequency signaling, wideband switching, Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, wireless, logged-in agents, offer category, maximum numbers of concurrently registered IP stations, administered IP trunks, ports, and concurrently administered remote office stations/trunks, call center release, logged-in automated call distribution or ACD agents, maximum currently registered IP stations, maximum administered IP trunks, offer category, maximum number of ports, maximum number of administered remote office trunks, and maximum number of mobile stations.

5. The method of claim 1, wherein the enterprise record comprises enterprise-level features and capacities and not non-enterprise-level features and capacities, and wherein the system records comprise non-enterprise-level features and capacities and not enterprise-level features and capacities.

6. The method of claim 1, wherein the enterprise record comprises enterprise-level features and capacities and not non-enterprise level features and capacities and wherein the system records comprise non-enterprise level features and capacities and not enterprise-level features and capacities.

7. The method of claim 1, wherein the first and second computational components are servers and wherein the following rules govern the generating steps:
 a total number of servers with a given activatable enterprise feature activated cannot exceed a value defined in a master license file;
 a total allocated capacity for each enterprise capacity feature cannot exceed a total capacity for that feature as defined in the master license file;
 an allocated enterprise feature capacity cannot be less than a current usage for that feature on a server;
 an enterprise feature capacity can only be allocated to a system having a system record identifier appearing in the master license file;
 an allocation of enterprise features and capacities to spare servers in a system is identical to an allocation to a corresponding main server;
 a calculation of a total allocation for a given feature is based only on the allocations to main servers; and
 an allocation to a spare server is not counted against a total allocation for the enterprise, wherein the enterprise is licensed to a maximum enterprise capacity and further comprising:
 determining whether the sum of the enterprise and first and second system capacities is less than the maximum enterprise capacity;
 when the sum is greater than the maximum capacity, determining that at least one of the first and second master licenses is invalid;
 providing a collection of non-enterprise-level features; and
 installing on the first and second computational components a standard license comprising the collection of non-enterprise-level features.

8. The method of claim 1, wherein the customer controls the allocation of the first, second, and third capacities for the enterprise-level licensable feature among the first, second, and third computational components, and wherein the customer does not control the allocation of fifth, sixth, and seventh non-enterprise-level licensable capacities among the first, second, and third computational components.

9. The method of claim 1, wherein a selected application has both enterprise-level and non-enterprise-level features and settings.

10. A non-transitory computer readable medium comprising machine executable instructions that, when executed by a server, perform the steps:
 creating, by a remote feature activation system including a processor, an enterprise record corresponding to an enterprise network and first, second, and third system records corresponding to first, second, and third computational components, respectively, in the enterprise network, the first, second, and third system records having first, second, and third system capacities, respectively, for an enterprise-level licensable feature and fifth, sixth, and seventh system capacities, respectively, for a non-enterprise-level licensable feature, wherein the first, second, and third capacities for the enterprise-level licensable feature are freely transferable, by a customer, to any of the first, second, and third computational components, and wherein the fifth, sixth, and seventh non-enterprise-level licensable capacities are not freely transferable, by the customer, to another of the first, second, and third computational components;
 during a first time interval, associating, at a first request of the customer, with the enterprise record, and by the remote feature activation system, the first and second system records;
 during the first time interval, creating and delivering, by the remote feature activation system, a first master license to the enterprise network, the first master license governing and permitting a total capacity for the enterprise-level licensable feature in the enterprise network that is at least the sum of the first and second system capacities;
 during the first time interval, creating and delivering first and second standard licenses to the first and second computational components, respectively, the first and second standard licenses having respective ones of the first, second, fifth, and sixth system capacities, wherein the first and second standard licenses include feature and maximum feature capacity information;
 during a second time interval, associating, at a second request of the customer, with the enterprise record, and by the remote feature activation system, the first and third system records, but not the second system record;
 during the second time interval, creating and delivering, by the remote feature activation system, a second master license to the enterprise network, the second master license permitting a total capacity for the enterprise-level licensable feature in the enterprise network that is a sum of at least the first and third system capacities, the sum excluding the second system capacity, wherein at least one of the first and second master licenses replaces the other of the first and second master licenses; and
 during the second time interval, creating and delivering a third standard license to the third computational component, the third standard license including the third and seventh system capacities.

* * * * *